Nov. 5, 1963
T. G. HARE
3,109,569
CAR TOP CARRIER
Filed March 21, 1960
2 Sheets-Sheet 1
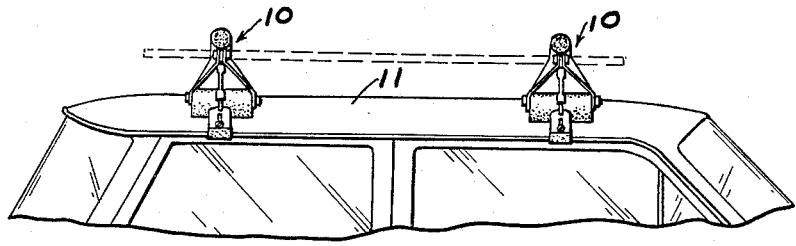
FIG. 1
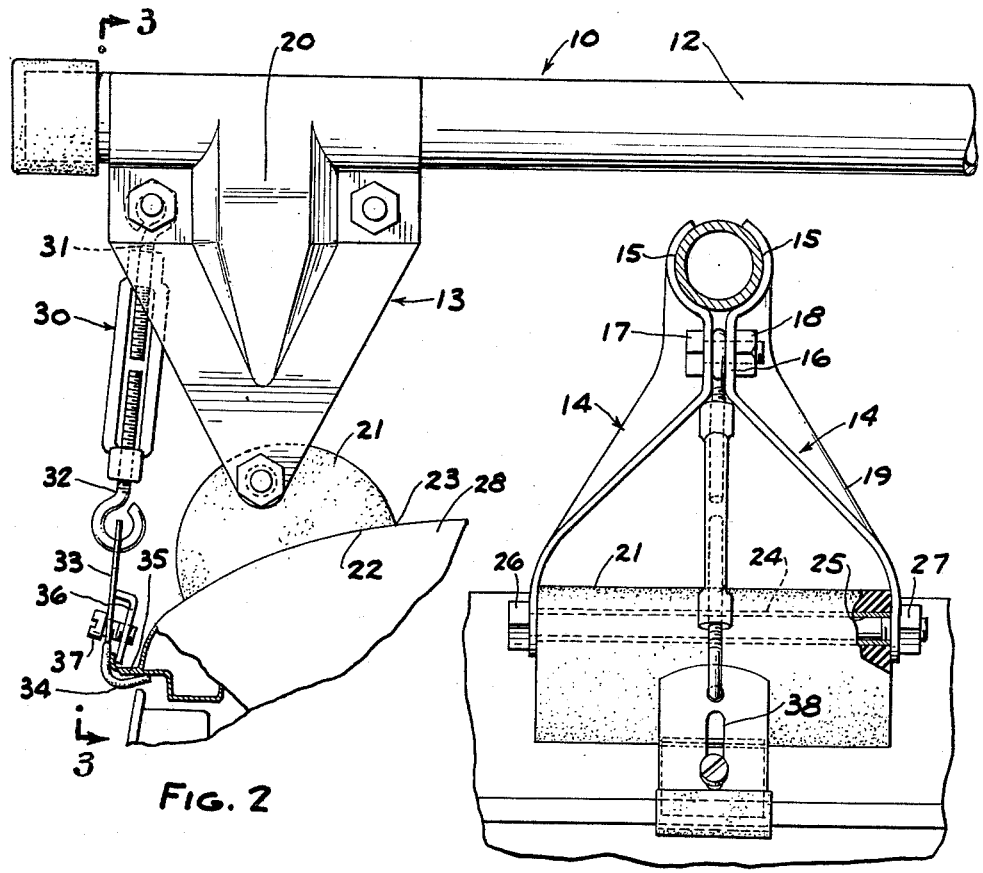
FIG. 2
FIG. 3
INVENTOR.
TERENCE G. HARE
BY
Barnes, Kisselle, Raisch & Choate
ATTORNEYS Nov. 5, 1963 T. G. HARE 3,109,569
CAR TOP CARRIER
Filed March 21, 1960 2 Sheets-Sheet 2

INVENTOR.
TERENCE G. HARE
BY
Barnes, Kisselle, Raisch & Choate
ATTORNEYS

United States Patent Office 3,109,569
Patented Nov. 5, 1963

3,109,569
CAR TOP CARRIER
Terence G. Hare, 17638 Grand River, Detroit, Mich.
Filed Mar. 21, 1960, Ser. No. 16,497
4 Claims. (Cl. 224—42.1)

This invention relates to car top carriers and particularly to car top carriers of the removable type.

One type of commonly used car top carrier utilizes suction cups on the underside of the carrier which engage the roof of the car to support the load. A disadvantage of suction cups is that when the load increases the cups collapse thereby tending to concentrate the loads on very small areas of the car top. Thus, in the better carriers, it is common to use metal pads which have a thin layer of plastic material on the underside thereof engaging the roof of the car. In addition to the high cost, such carriers have a disadvantage in that the pads do not always conform properly to the curvature of the car top and thus must either be reshaped or else the weight is not distributed over a large area of the pad.

A problem in all car top carriers is the instability that results when the inertia of the carrier tends to pull the carrier longitudinally of the car.

It is an object of this invention to provide a car top carrier which includes novel means for supporting the carrier on the car top wherein the load is distributed over relatively wide areas; to provide such a car top carrier wherein the increased load tends to increase the force with which the carrier is held in position on the roof of the car; to provide such a car top carrier which can be readily adapted to car tops of varying configurations without adjustment and without the use of any tools; to provide such a car top carrier which can be manufactured at relatively low cost; to provide such a car top carrier which is relatively stable against the inertia of sudden stops; and to provide a car top carrier which utilizes a standard piece of pipe or the like thereby enabling the carrier to be merchandised, sold and stored as a package without such a pipe.

In the drawings:

FIG. 1 is a side elevation of the car top carrier embodying the invention in position on the roof of a car.

FIG. 2 is a fragmentary front elevation of the carrier shown in FIG. 1, parts being broken away.

FIG. 3 is a fragmentary sectional view taken along the line 3—3 in FIG. 2.

Figure 4:
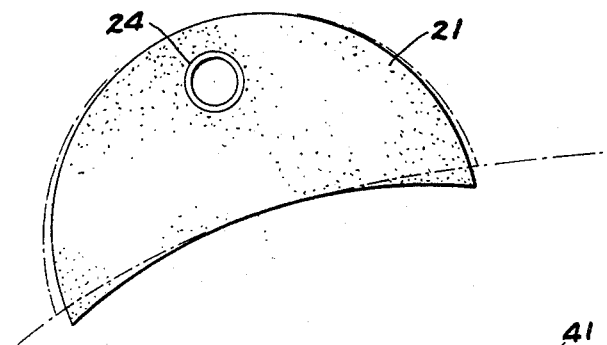
FIG. 4 is an end view of a rubber block utilized in the carrier.

Referring to FIG. 1, the car top carrier embodying the invention comprises one or more assemblies 10 which are adapted to be mounted at longitudinally spaced points on the roof 11 of the car. Each assembly 10 comprises a tube or rod 12, which may be a length of standard pipe, and a bracket assembly 13 on each end of the pipe 12.

Each bracket assembly comprises a pair of brackets 14, the upper portions of which are arcuate as at 15 for clamping engagement with the tube 12. The intermediate portions 16 of each bracket are flattened. Bolts 17 extend through portions 16 and nuts 18 are threaded thereon to clamp the brackets on the tube 12. The lower portion 19 of each bracket is generally triangular in shape and extends downwardly to form a leg, the apex of which extends outwardly beyond the plane of the portions 15 and 16 of each bracket. A vertical strengthening rib 20 is provided in each bracket as shown in FIGS. 2 and 3.

A rubber block 21 is pivotally mounted between the legs 19. Block 21 is preferably extruded with an opening and a sleeve 25 is then inserted in the opening. Block 21 includes a concave cylindrical undersurface 22 and straight side edges 23 and end edges 24. A bolt 26 extends through the legs 19 and through sleeve 25 to pivotally mount the block 21 on the lower ends of the legs 19. A nut 27 is threaded on the free end of the bolt. Block 21 is preferably made of a natural or synthetic rubber which will withstand the elements, which will not flex unduly under load and yet will readily conform to the varying curvatures of different car tops. The block has a length which is several times its thickness and which is greater than its width.

As shown in FIG. 4, the axis of cylindrical surface 22 is adapted to extend longitudinally of the car top. The radius of curvature of the surface 22 of block 21 is preferably less than the radius of curvature of the portion 28 of the roof 11 which the block engages so that the block 21 firmly seats against the portion 28 of the roof 11 and the sharp edges 23 of the block seal the undersurface preventing the entry of dirt, moisture and the like beneath the block 21.

As shown in FIG. 2, a turnbuckle 30 has upper screw 31 thereof formed with an eye through which the bolt 17, which is outermost in the bracket assembly 13, extends thereby pivoting the screw 31 on the bolt. Lower screw 32 of the turnbuckle 30 is also formed with an eye and is hooked into a hook member 33 which, as shown in FIG. 3, includes an inwardly turned hook portion 34 that is adapted to engage the underside of the drip trough 35 of the roof of the automobile. A lock member 36, which is generally L-shaped, has its lower edge engaging the inner surface of the eave 35. The lock member is held in position by a screw 37 extending through an elongated vertical opening 38 in hook member 33 and threaded into the lock member 36. In this manner, the hook member 33 is held in position on the drip trough 35. Hook portion 34 and lock member 36 are preferably coated with plastic to prevent scratching of the drip trough 35.

In applying the car top carrier to the roof 11 of the car, the bracket assemblies are first assembled on tube 12 and then the tube 12 with the pair of bracket assemblies is placed in position on the roof 11 of the car. The turnbuckles 30 on each end of tube 12 are loosened permitting the hook members 33 to be brought in position with the hook portions 34 thereof engaging the underside of the drip trough 35. The turnbuckles 30 are then progressively tightened drawing the brackets 14 downwardly and compressing the rubber blocks 21 against the portions 28 of the roof. After the turnbuckle has been tightened sufficiently to firmly cause a gripping of the blocks 21 with the top of the roof, each lock member 36 is moved downwardly and the corresponding screw 37 is tightened to lock the hook 33 on the drip trough 35.

As shown in FIG. 3, the arrangement is such that the shaft 25, brackets 14 and tube 15 form a triangle which has a vertical apex and a horizontal base extending forwardly and rearwardly of the car. This provides improved stability in a direction longitudinally of the car so that when the car stops the inherent inertia of the carrier is readily overcome by the relatively large area longitudinally of the vehicle which is contacting the car top.

Since the upper screw 31 of each turnbuckle is pivoted to the bolt 17 which lies horizontally outwardly of the bolt 26 which pivots the rubber block 21 to the bracket, the tightening of the turnbuckle tends to bow the tube 12 upwardly. When the load is applied to the tube, the load tends to overcome this upward bowing and increased loading tends to cause the pipe to bow downwardly increasing the tension on the turnbuckle thereby increasing the gripping force on the drip trough.

Figure 5:
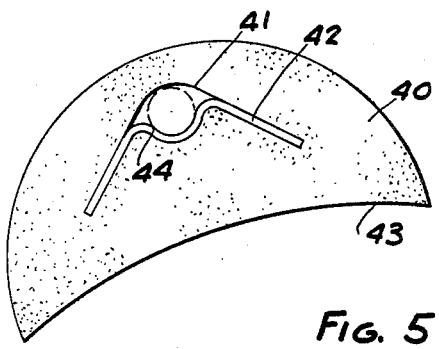
FIG. 5 is an end view of a modified form of supporting pad.
Figure 6:
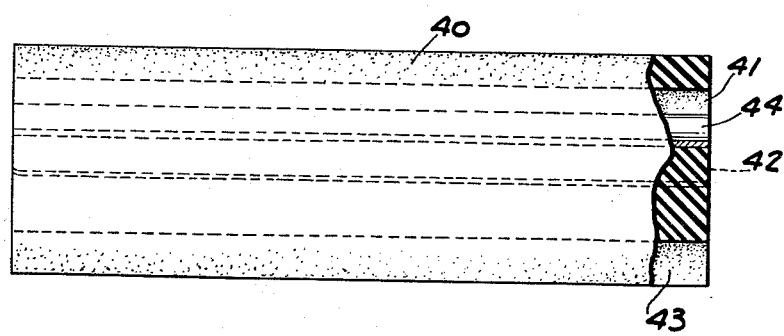
FIG. 6 is a side elevation of the pad shown in FIG. 5.

A modified form of rubber block is shown in FIGS. 5 and 6 wherein the block 40 is formed with an opening 41 and an inset plate 42 positioned in opening 41. Plate 42 is generally triangular in shape with the legs thereof diverging downwardly toward the underside 43 of the block and has a longitudinally extending channel or groove 44 at the apex of the triangle which serves as a support for the bolt 25 of the carrier. This form of block can be extruded with opening 41 and the plate 42 thereafter inserted.

It can thus be seen that I have provided a car top carrier which provides effective contact and distribution of the load over a large area of the car top regardless of the varying curvatures of different car tops. The car carrier has substantial stability in both transverse and longitudinal directions of the car. As the load on the carrier increases, the force with which the carrier is held in position on the roof of the car also increases. The carrier uses a minimum number of parts and since it also utilizes a standard piece of pipe or tubing, the carrier may be packaged and sold without such a pipe or tube thereby minimizing the merchandise and handling costs and further reducing the price of the carrier. As shown, the carrier can be readily assembled and disassembled from its position on the roof of the car.

I claim:

1. A bracket assembly for use with a piece of pipe to make a car top carrier comprising a pair of complementary brackets, means on each said bracket for clamping said bracket to one end of a piece of pipe when the brackets are brought together, a single rubber block for said pair of brackets, the lower ends of said brackets defining horizontally spaced portions, a pin extending between said portions transversely of said pipe, said block including an opening through which said pin extends, said block having a curved undersurface which is generally cylindrical with its axis parallel to the axis of the pin, said block forming the sole support for its respective bracket, said block having its greatest dimension extending transversely to the axis of the pipe, and longitudinally extensible means pivoted to said pair of brackets at a point vertically above and horizontally outwardly with respect to the axis of the pin, said latter means having portions adapted to engage the drip trough on the roof of a car for applying a force to the pair of brackets.

2. In a car top carrier, the combination comprising a rod, a pair of complementary brackets for each end of the rod, means on each said bracket for clamping said bracket to said rod when the brackets are brought together, a single rubber block for each said bracket, the lower ends of said brackets defining horizontally spaced portions, a pin extending between said portions transversely of said rod, said block including an opening through which said pin extends, said block having a curved undersurface which is generally arcuate with its axis parallel to the axis of the pin, said block forming the sole support for each said pair of brackets, said block having its greatest dimension extending transversely to the axis of the rod, and longitudinally extensible means pivoted to each pair of said brackets at a point vertically above and horizontally outwardly with respect to the axis of the pin, said latter means having portions adapted to engage the drip trough on the roof of a car for applying a force to the pair of brackets.

3. The combination set forth in claim 2 including a sleeve positioned in said opening of said block, said sleeve extending throughout the length of said opening and engaging said pin to form the bearing between said block and said pin.

4. The combination set forth in claim 2 including an insert plate in said opening extending throughout the length of the opening in the block, said insert plate including a longitudinally extending groove forming the bearing between said pin and said block.

References Cited in the file of this patent

UNITED STATES PATENTS

| 1,281,840 | Roffy | Oct. 15, 1918 |
| 1,761,533 | Patch | June 3, 1930 |
| 1,831,098 | Davis | Nov. 10, 1931 |
| 2,416,120 | Roberts | Feb. 18, 1947 |
| 2,596,860 | McCrory et al. | May 13, 1952 |
| 2,613,020 | Berry | Oct. 7, 1952 |
| 2,812,992 | Lysen | Nov. 12, 1957 |

FOREIGN PATENTS

| 699,968 | Great Britain | Nov. 18, 1953 |
| 105,463 | Sweden | Sept. 8, 1942 |
| 1,175,152 | France | Nov. 10, 1958 |
| 299,557 | Switzerland | Aug. 16, 1954 |